US010823596B2

United States Patent
Ye et al.

(10) Patent No.: US 10,823,596 B2
(45) Date of Patent: Nov. 3, 2020

(54) ULTRASONIC FLOW METER SYSTEM AND METHOD FOR MEASURING FLOW RATE

(71) Applicant: General Electric Company, Schenectady, NY (US)

(72) Inventors: Jing Ye, Shanghai (CN); Yan Mei, Shanghai (CN); Xiaolei Ao, Billerica, MA (US); Weihua Shang, Shanghai (CN); Ran Niu, Shanghai (CN); Gregory Ronald Gillette, Niskayuna, NY (US); Christopher Edward Wolfe, Niskayuna, NY (US); Robert Arnold Judge, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 92 days.

(21) Appl. No.: 15/533,658

(22) PCT Filed: Dec. 4, 2015

(86) PCT No.: PCT/US2015/063894
§ 371 (c)(1),
(2) Date: Jun. 7, 2017

(87) PCT Pub. No.: WO2016/094214
PCT Pub. Date: Jun. 16, 2016

(65) Prior Publication Data
US 2017/0314979 A1 Nov. 2, 2017

(30) Foreign Application Priority Data

Dec. 8, 2014 (CN) .......................... 2014 1 0747550

(51) Int. Cl.
*G01F 1/66* (2006.01)
*E21B 21/08* (2006.01)
*E21B 47/10* (2012.01)

(52) U.S. Cl.
CPC .............. *G01F 1/667* (2013.01); *E21B 21/08* (2013.01); *E21B 47/101* (2013.01); *G01F 1/663* (2013.01)

(58) Field of Classification Search
CPC ........ G01F 1/667; G01F 1/668; G01F 25/007; G01F 1/663; G01F 15/00; G01F 1/66; E21B 21/08; E21B 47/101
(Continued)

(56) References Cited

U.S. PATENT DOCUMENTS 7,437,948 B2   10/2008   Kishiro et al.
7,581,453 B2   9/2009   Ao et al.
(Continued)

FOREIGN PATENT DOCUMENTS

CN   1358365 A    7/2002
CN   2814350 Y    9/2006
(Continued)

OTHER PUBLICATIONS

Machine Translation and First Office Action and Search issued in connection with corresponding CN Application No. 201410747550.X dated Jun. 29, 2018.
(Continued)

*Primary Examiner* — Robert R Raevis
(74) *Attorney, Agent, or Firm* — Hogan Lovells US LLP

(57) ABSTRACT

An ultrasonic flow meter system includes a conduit defining a channel, at least one pair of first transducers, at least one second transducer, and a processor. The pair of first transducers is mounted on the conduit and includes a transmitting transducer and a receiving transducer for generating a first responsive signal. The transmitting transducer and the receiving transducer are arranged on a chordal path. The second transducer is mounted on the conduit for generating a second responsive signal. The processor is configured to
(Continued)

receive the first responsive signal and the second responsive signal, select one responsive signal according to a relationship of the first responsive signal and noise thereof and a relationship of the second responsive signal and noise thereof, and determine a flow rate of a flow medium according to the selected responsive signal. A method for measuring the flow rate of the fluid medium is also provided.

20 Claims, 8 Drawing Sheets

(58) Field of Classification Search
USPC .............. 73/861.18, 861.25, 861.27–861.31
See application file for complete search history.

(56) References Cited

U.S. PATENT DOCUMENTS

| | | | |
|---|---|---|---|
| 7,584,065 | B2 | 9/2009 | Yamada et al. |
| 7,950,451 | B2 | 5/2011 | Alberty et al. |
| 8,019,559 | B1 | 9/2011 | Stevens et al. |
| 2005/0229716 | A1 | 10/2005 | Unsworth et al. |
| 2006/0174717 | A1 | 8/2006 | Ishikawa |
| 2007/0167792 | A1 | 7/2007 | Ohmuro et al. |
| 2011/0126636 | A1 | 6/2011 | Skripalle |
| 2012/0085166 | A1* | 4/2012 | Furlong .................. G01F 1/363 |
| | | | 73/32 R |
| 2012/0173169 | A1 | 7/2012 | Skelding |

FOREIGN PATENT DOCUMENTS

| | | |
|---|---|---|
| CN | 101573594 A | 11/2009 |
| CN | 202002682 U | 10/2011 |
| CN | 102288235 A | 12/2011 |
| CN | 203132616 U | 8/2013 |
| CN | 103926422 A | 7/2014 |
| CN | 105444825 A | 3/2016 |
| CN | 105738649 A | 7/2016 |
| WO | 2008/082807 A1 | 7/2008 |

OTHER PUBLICATIONS

Office Action issued in connection with corresponding MX Application No. Mx/A/2017/007423 dated Oct. 1, 2018.
Second Office Action issued in connection with corresponding CN Application No. 201410747550.X dated Nov. 12, 2018 (English Translation Unavailable).
Kunadt, A., et al., "Ultrasonic flow meter with piezoelectric transducer arrays integrated in the walls of a fiber-reinforced composite duct," IEEE Sensors, pp. 1-4 (Oct. 28-31, 2012).
Mori, M., et al., "Development of a Novel Flow Metering System Using Ultrasonic Velocity Profile Measurement," Springer, vol. 32, Issue 2, p. 1 (Feb. 2002).
Willson, K., "Principles and pitfalls of flow assessment by Doppler ultrasound," IEE Colloquium on Medical Scanning and Imaging Techniques of Value in Non-Destructive Testing, pp. 1-4 (Nov. 3, 1989).
International Search Report and Written Opinion issued in connection with corresponding PCT Application No. PCT/US2015/063894 dated Apr. 8, 2016.
International Preliminary Report on Patentability issued in connection with corresponding PCT Application No. PCT/US2015/063894 dated Jun. 13, 2017.

* cited by examiner

ULTRASONIC FLOW METER SYSTEM AND METHOD FOR MEASURING FLOW RATE

BACKGROUND

Ultrasonic transducers are widely used to measure a flow rate of a flow in a conduit. For example, the ultrasonic transducers may be used to obtain velocity information of the flow based on Doppler theory or transit-time theory. Typically, a Doppler ultrasonic transducer is mounted on the conduit wall. The pulsed ultrasonic wave emitted from the Doppler ultrasonic transducer propagates to the flow inside the conduit. Scattering components such as impurities and contaminations in the flow reflect the wave and the Doppler ultrasonic transducer receives the echo. Doppler theory allows for velocity calculation by one or more known formulas. The flow rate of the flow can be determined based on the velocity information. Doppler flow metering method is appropriate for the flow with considerable scatters therein.

Transit time flow metering is also a common ultrasonic method to measure the flow rate of the flow in the conduit. One transducer emits a sound wave through the flow which is detected by another transducer. The transit times of the wave are used to calculate speed of sound of the flow and further the flow rate is calculated using the speed of sound, path length, the transit times and conduit dimension data. The transit time flow metering method is appropriate for clean flow with no or few scattering components therein.

If the flow composition is unknown and/or unstable, neither the Doppler flow metering method nor the transit time flow metering method can reliably measure the flow rate.

It is desirable to provide a solution to address at least one of the above-mentioned problems.

BRIEF DESCRIPTION

In one aspect, the present disclosure relates to an ultrasonic flow meter system for measuring a flow rate of a fluid medium. The ultrasonic flow meter system includes a conduit defining a channel, at least one pair of first transducers, at least one second transducer, and a processor. The pair of first transducers is mounted on the conduit and includes a transmitting transducer and a receiving transducer for generating a first responsive signal. The transmitting transducer and the receiving transducer are arranged on a chordal path. The second transducer is mounted on the conduit for generating a second responsive signal. The processor is configured to receive the first responsive signal and the second responsive signal, select one of the first responsive signal and the second responsive signal according to a relationship of the first responsive signal and noise thereof and a relationship of the second responsive signal and noise thereof, and determine a flow rate of a flow medium through the channel in the conduit according to the selected responsive signal.

In another aspect, the present disclosure relates to a method for measuring a flow rate of a fluid medium. The method includes transmitting a first ultrasound signal along a chordal path through a conduit via a transmitting transducer of a first transducer pair, and generating a first responsive signal in response to the first ultrasound signal via a receiving transducer of the first transducer pair on the chordal path. The method further includes transmitting a second ultrasound signal into the conduit via a second transducer, and generating a second responsive signal in in response to a scattered signal from the second ultrasound signal via the second transducer. The method further includes generating, via a processor, a flow rate of a flow medium through the conduit according to one of the first responsive signal and the second responsive signal. The method further includes selecting one of the first responsive signal and the second responsive signal according to a relationship of the first responsive signal and noise thereof and a relationship of the second responsive signal and noise thereof, and determining a flow rate of a flow medium through the conduit according to the selected responsive signal.

BRIEF DESCRIPTION OF THE DRAWINGS

The above and other aspects, features, and advantages of the present disclosure will become more apparent in light of the subsequent detailed description when taken in conjunction with the accompanying drawing in which.

DETAILED DESCRIPTION

One or more specific embodiments of the present disclosure will be described below. Unless defined otherwise, technical and scientific terms used herein have the same meaning as is commonly understood by one of ordinary skill in the art to which this invention belongs.

The terms "first," "second," and the like, herein do not denote any order, quantity, or importance, but rather are used to distinguish one element from another. The terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. Moreover, the terms "coupled" and "connected" are not intended to distinguish between a direct or indirect coupling/connection between components. Rather, such components may be directly or indirectly coupled/connected unless otherwise indicated. Approximating language, as used herein throughout the specification and claims, may be applied to modify any quantitative representation that could permissibly vary without resulting in a change in the basic function to which it is related.

Figure 1:
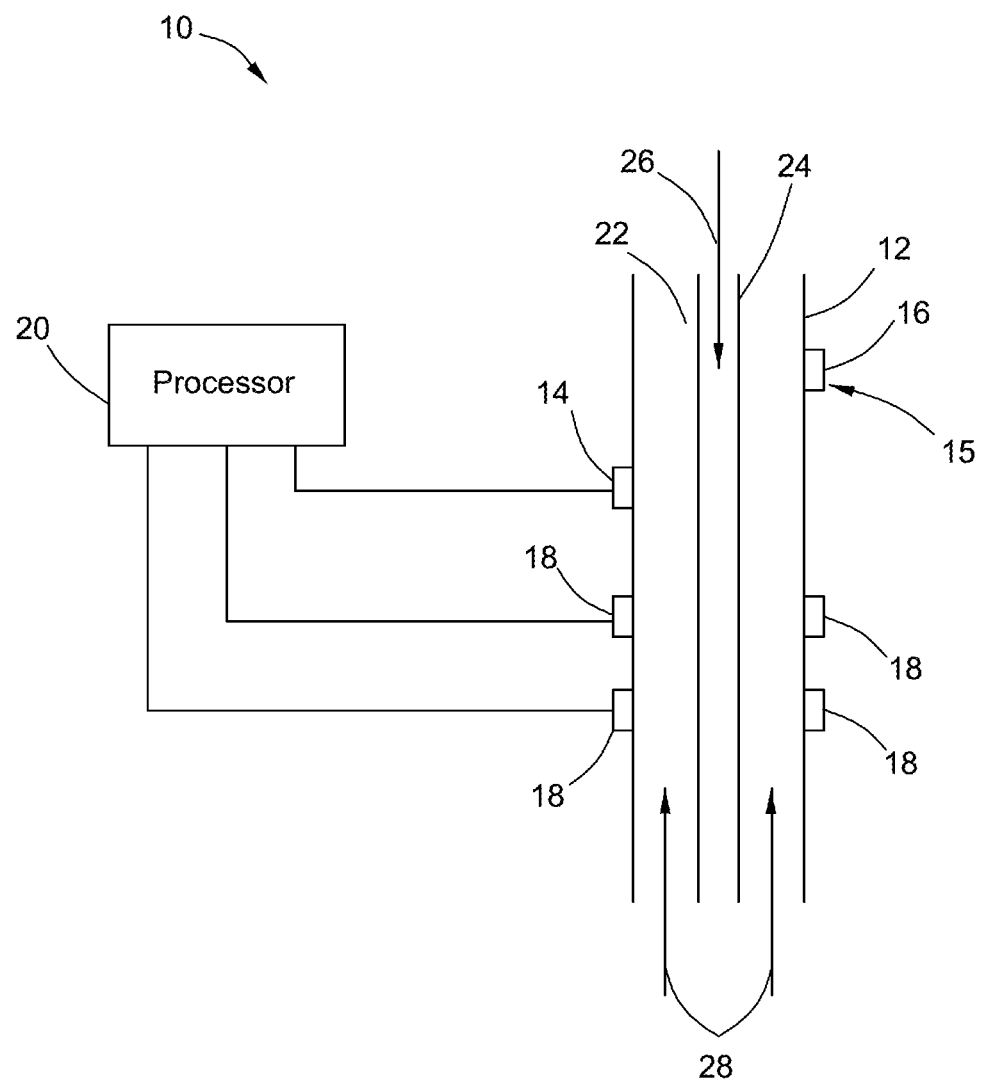
FIG. 1 is a schematic diagram of an ultrasonic flow meter system in accordance with one embodiment.

FIG. 1 illustrates a schematic diagram of an ultrasonic flow meter system 10 in accordance with one embodiment. The ultrasonic flow meter system 10 is configured to measure flow rate of a flow medium (i.e. liquid and/or gas or multi-phase flow). In one embodiment, the ultrasonic flow meter system 10 may be applicable for measuring fluid flow at high temperature and high pressure. For example, the ultrasonic flow meter system 10 may be employed in a drilling system configured to drill wells for exploration and production of hydrocarbons. Non-limiting examples of the wells include onshore and offshore wells. In another embodiment, the ultrasonic flow meter system 10 may be employed in any other applications to measure flow rate of the flow medium through ultrasonic methodology.

As illustrated in FIG. 1, the ultrasonic flow meter system 10 includes a conduit 12, a pair of first transducers 15, multiple second transducers 18 and a processor 20. The conduit 12 defines a channel 22. In one embodiment, the conduit 12 has a tubular cross section. In the illustrated embodiment, the channel 22 accommodates a pipe 24, such as a drilling pipe receiving a flow of a drilling fluid 26 (also referred to as a drilling mud) into a well. The channel 22 also accommodates a flow of a returning drilling fluid 28 transmitted from the well during drilling. The returning drilling fluid 28 is transmitted back through an annular space between the pipe 24 and the conduit 12.

In the illustrated embodiment in FIG. 1, the drilling pipe 24 (also referred to as a drill string) is formed from lengths of tubular segments connected end to end. A drill bit (not shown) is assembled onto an end of the drilling pipe 24 and rotates to perform the drilling of the well bore below a seabed. The drilling pipe 24 is configured to secure the drill bit to transmit the drilling fluid 26 into the well. The drilling pipe 24 may vibrate as the drilling fluid 26 passes through, so that the flow of the returning drilling fluid 28 may be unstable.

The drilling fluid 26 maintains a hydrostatic pressure to counter-balance the pressure of fluids in the formation and cools the drill bit while also carrying materials excavated, such as cuttings including crushed or cut rock during drilling. In some examples, the drilling fluid 26 may include water or oil, and various additives. The returning drilling fluid 28 has uncertain flow composition. Sometimes, the returning drilling fluid 28 includes many scattering components such as cuttings, small bubbles, particles and other entrained matter. Sometimes, the returning drilling fluid 28 is quite clean, for example, the returning drilling fluid 28 is sea water or includes very few scattering components. The ultrasonic flow meter system 10 is capable of measuring the flow rate of the returning drilling fluid 28 as the flow composition of the returning drilling fluid 28 is changing.

Figure 2:
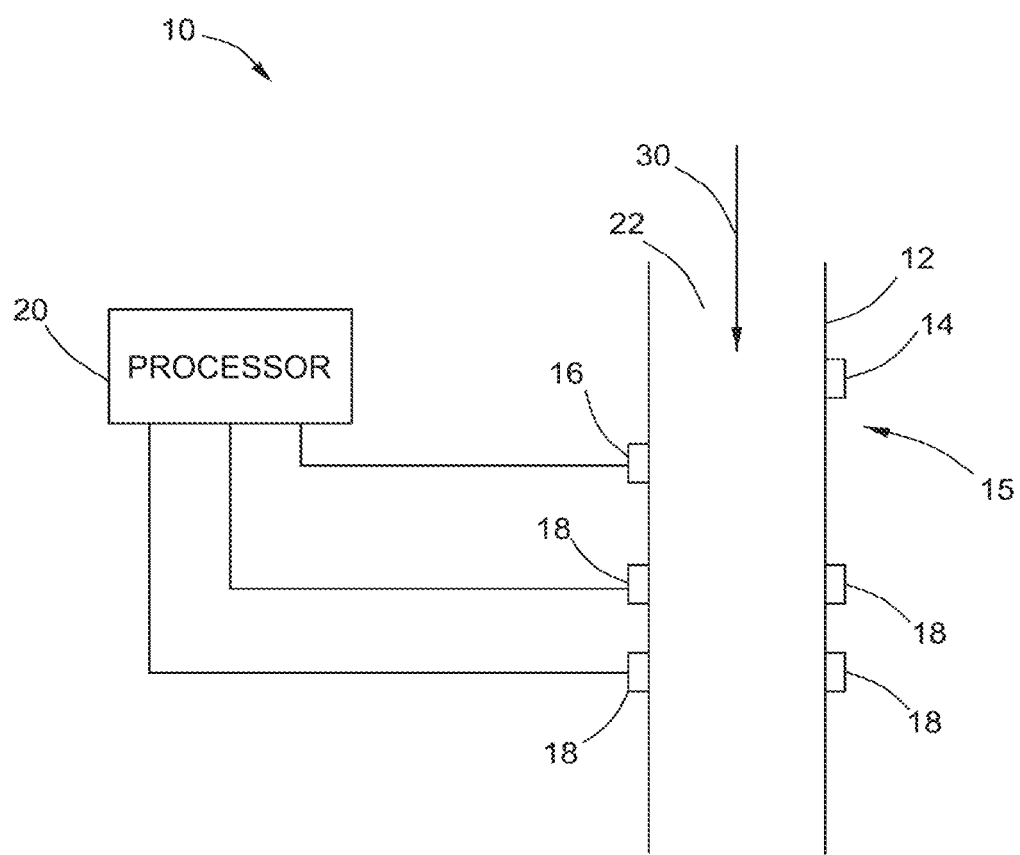
FIG. 2 is a schematic diagram of the ultrasonic flow meter system in accordance with another embodiment.

In another embodiment, the ultrasonic flow meter system 10 may measure the flow rate of any other flow medium which has uncertain flow composition. As illustrated in FIG. 2, the ultrasonic flow meter system 10 is configured to measure a flow medium 30 flowing through the conduit 12 without a pipe therein. The flow medium 30 may have changing flow composition. Sometimes, the flow medium 30 includes many scattering components, for example, small bubbles, particles and other entrained matter. Sometimes, the flow medium 30 does not have scattering components or includes quite few scattering components.

As illustrated in FIGS. 1 and 2, the pair of first transducers 15 is mounted on the conduit 12 and includes a transmitting transducer 14 and a receiving transducer 16 for generating a first responsive signal. Only one first transducer pair 15 is illustrated, but in non-limiting embodiments, two or more first transducer pairs 15 may be mounted on the conduit 12 to measure the flow rate of the returning drilling fluid 28 or the flow medium 30 from different directions. The transmitting transducer 14 is configured to transmit a first ultrasound signal along a chordal path through the conduit 12. The receiving transducer 16 is configured to receive the first ultrasound signal and generate a first responsive signal in response to the first ultrasound signal. The transmitting transducer 14 is located on upstream of the returning drilling fluid 28 or the flow medium 30, and the receiving transducer 16 is located on downstream of the returning drilling fluid 28 or the flow medium 30.

In one embodiment, the first transducer pair 15 includes transit-time transducers for generating a transit-time signal. The transmitting transducer 14 and the receiving transducer 16 are transit-time transducers and the first responsive signal is the transit-time signal. When the returning drilling fluid 28 or the flow medium 30 is clean, the first ultrasound signal from the transmitting transducer 14 transmits easily through the returning drilling fluid 28 or the flow medium 30 to arrive the receiving transducer 16, so that the transit-time signal is good enough for generating the flow rate.

The second transducers 18 are mounted on the conduit 12 for generating second responsive signals. The second transducers 18 each transmit a second ultrasound signal into the conduit 12. The second ultrasound signals are reflected or backscattered by the scattering components in the returning drilling fluid 28 or the flow medium 30 to generate scattered signals. The second transducers 18 receive the scattered signals and generate second responsive signals in response to the scattered signals. In one embodiment, each the second transducer 18 receives the scattered signal from the second ultrasound signal transmitted by that second transducer itself. In another embodiment, at least one of the second transducers 18 may receive the scattered signal from the second ultrasound signal transmitted by different second transducers 18 and that second transducer 18. Four second transducers 18 are illustrated in FIGS. 1 and 2, but not limited. The number of the second transducers 18 may be set according to particular applications.

In one embodiment, the second transducers 18 include one or more Doppler transducers for generating a Doppler signal. The second responsive signal is Doppler signal. When the returning drilling fluid 28 or the flow medium 30 includes many scattering components, the second ultrasound signal is reflected or backscattered by the scattering components, so that the Doppler signal is good enough for generating the flow rate.

The processor 20 is configured to determine a flow rate of the returning drilling fluid 28 or the flow medium 30 according to a relationship of the first responsive signal and noise thereof and a relationship of the second responsive signal and noise thereof. The processor 20 receives the first responsive signal from the receiving transducer 16 and the second responsive signal from the second transducers 18. The processor 20 processes the first responsive signal and the second responsive signal to select one of the first responsive signal and the second responsive signal. And the processor 20 further processes the selected responsive signal to determine the flow rate of the returning drilling fluid 28 or the flow medium 30.

In one embodiment, the processor 20 selects one responsive signal based on SNR (Signal Noise Ratio) of the first responsive signal and the second responsive signal. In an example, the second transducers 18 are Doppler transducers and the first transducers 14 and 16 are transit-time transducers. The processor 20 selects the Doppler signal from the Doppler transducers 18 prior to the transit-time signal from the transit-time transducer 16 unless the SNR of the Doppler signal does not meet requirement. If the SNR of the Doppler signal meets the requirement, i.e. the SNR of the Doppler signal is high enough for generating reliable flow rate, the processor 20 generates the flow rate according to the Doppler signal in a Doppler method. If the SNR of the Doppler signal does not meet requirement, i.e. the SNR of the Doppler signal is not high enough to generat reliable flow rate, the processor 20 generates the flow rate according to the transit-time signal in a transit-time method. In another example, the processor 20 selects the transit-time signal prior to the Doppler signal unless the SNR of the transit-time signal does not meet requirement. The processor 20 determines the flow rate according to the transit-time signal at transit-time mode by default. If the SNR of the transit-time signal is not high enough to get reliable time of flight from the transmitting transducer 14 to the receiving transducer 16, the processor 20 determines the flow rate at Doppler mode. The processor 20 can switch between the Doppler mode and the transit-time mode automatically without knowing the flow composition of the flow medium.

In another example, the processor 20 selects one responsive signal with higher SNR from the first responsive signal and the second responsive signal. In still another example, the processor 20 selects one responsive signal according to at least one of amplitudes, energy spectrums and spatial spectrums of the responsive signals and the noises thereof. In yet another embodiment, the processor 20 may select one responsive signal according to another relationship between the responsive signals and the noises to determine the reliable flow rate.

It should be noted that the arrangements in FIGS. 1 and 2 are merely illustrative. Some elements are not illustrated, such as a controller at least for controlling the first transducers 14 and 16 and the second transducers 18 to transmit ultrasound signal.

Figure 3:
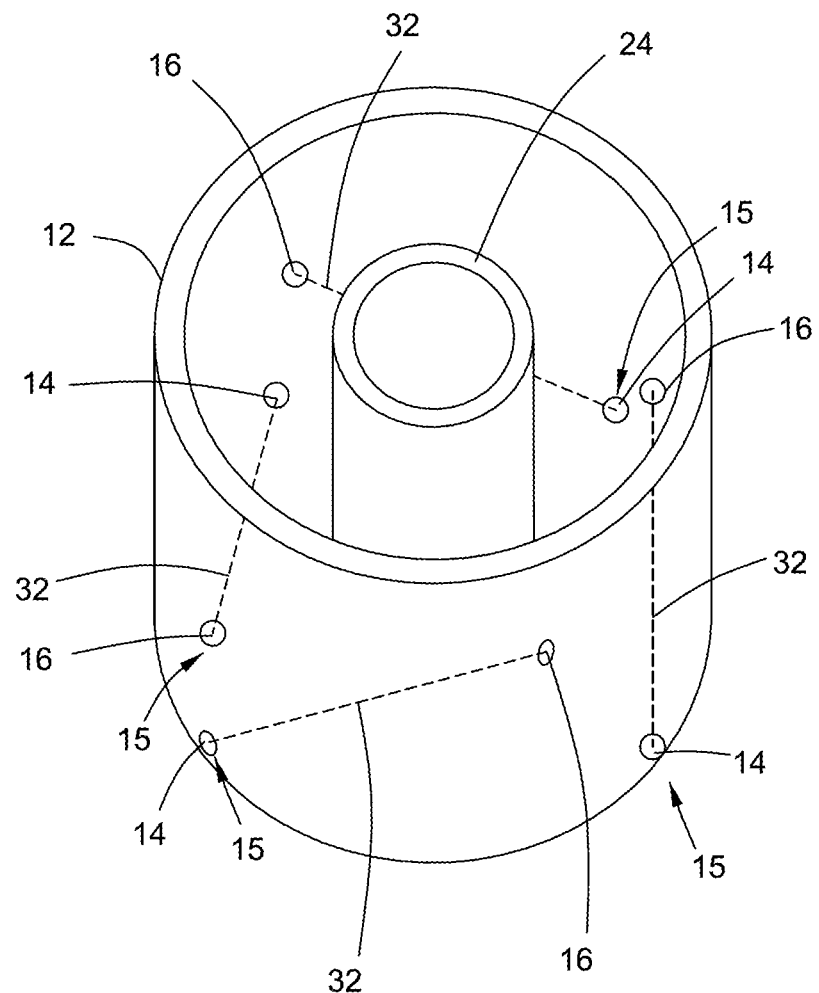
FIG. 3 is a schematic perspective view of a part of a conduit and first transducer pairs of the ultrasonic flow meter system in accordance with one embodiment.

FIG. 3 illustrates a schematic perspective view of a part of the conduit 12 and the first transducer pairs 15 in accordance with one embodiment. The transmitting transducer 14 and the receiving transducer 16 of each first transducer pair 15 are arranged on a chordal path 32 to avoid sound path blockage by the pipe 24 in the conduit 12 and get a longer path the first ultrasound signal transmitting along. The transmitting transducer 14 transmits the first ultrasound signal along the chordal path 32 and the receiving transducer 16 receives the first ultrasound signal through the chordal path 32. Multiple first transducer pairs 15 are arranged around the conduit 12, i.e. the chordal paths 32 are arranged around the conduit 12, to measure the flow rate of the fluid medium (not shown) from different directions.

Figure 4:
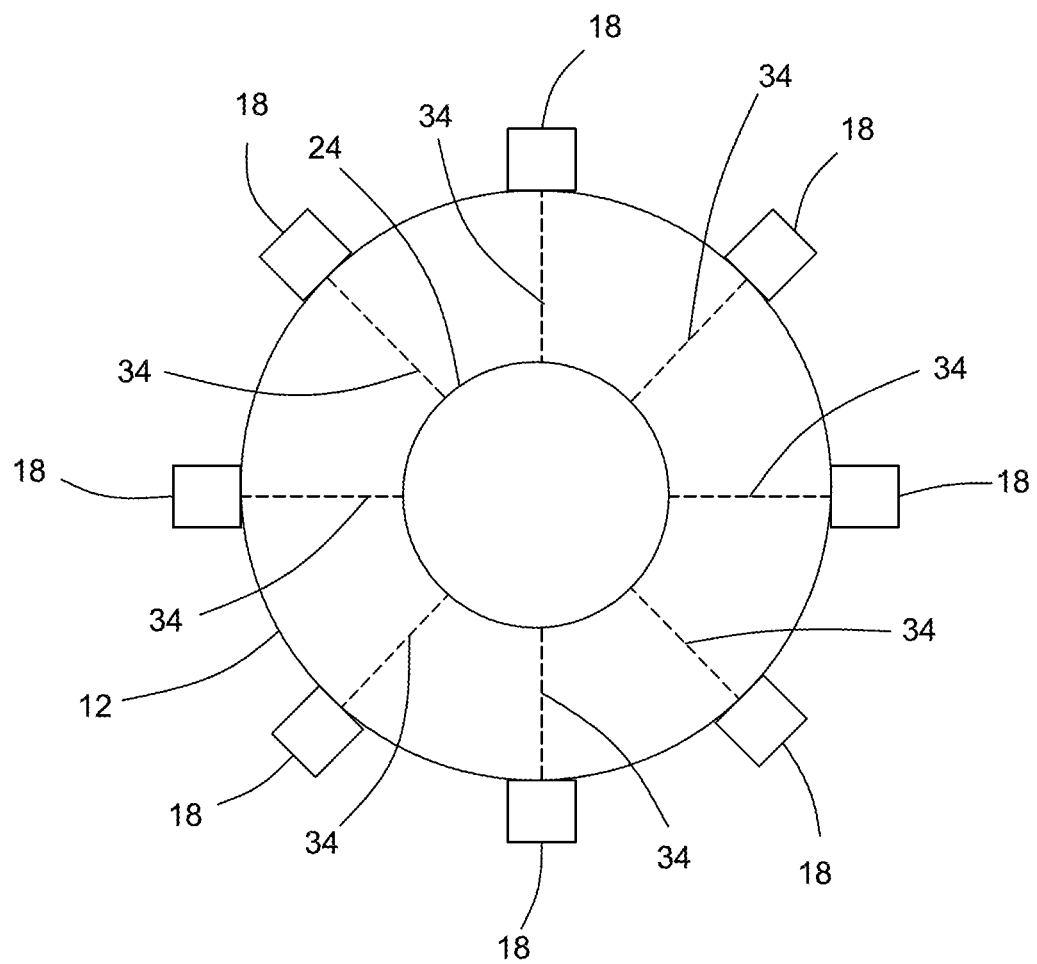
FIG. 4 is a schematic cross-sectional view of the conduit with second transducers thereon in accordance with one embodiment.

FIG. 4 illustrates a schematic cross-sectional view of the conduit 12 with the second transducers 18 thereon in accordance with one embodiment. The second transducers 18 are arranged on diameter paths 34. Each second transducer 18 transmits the second ultrasound signal along the diameter path 34 and receives the scattered signals reflected or backscattered by the scattering components (not shown) in the fluid medium (not shown). In another embodiment, the second transducers 18 may be arranged on chordal paths. In the illustrated embodiment, the second transducers 18 are arranged around the conduit 12 to measure the flow rate of the fluid medium from different directions. The second transducers 18 are arranged uniformly on a plane around the conduit 12. In the illustrated embodiment, each second transducer 18 is arranged to receive the scattered signals from the ultrasound signal transmitted by that second transducer.

Figure 5:
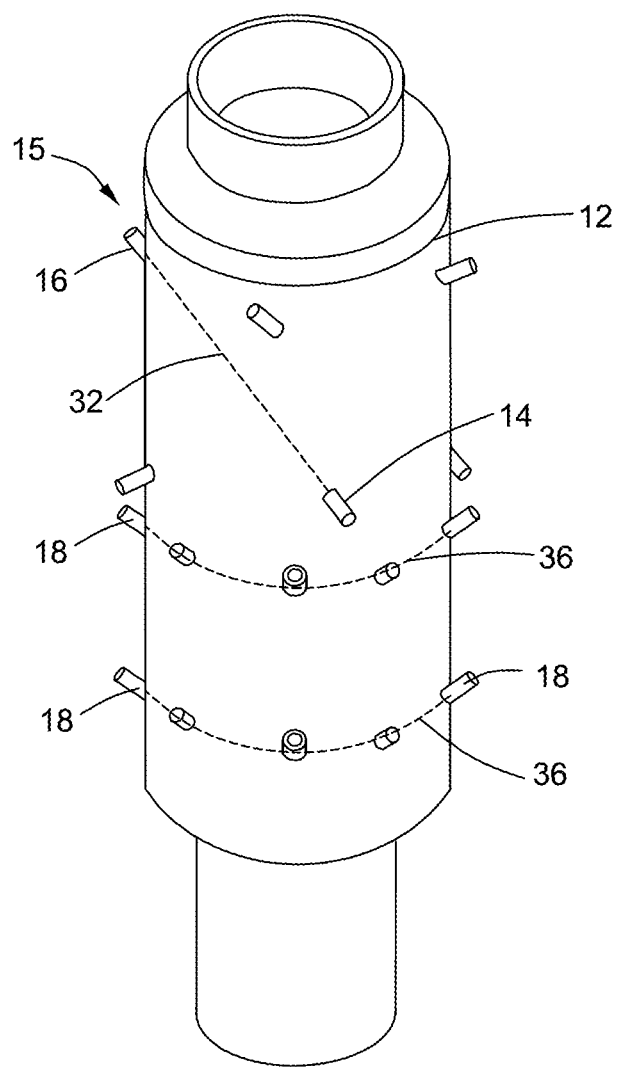
FIG. 5 is a schematic perspective view of a part of the conduit with the first transducer pairs and the second transducers thereon in accordance with one embodiment.

FIG. 5 illustrates a schematic perspective view of a part of the conduit 12 with the first transducer pairs 15 and the second transducers 18 thereon in accordance with one embodiment. The second transducers 18 include multiple arrays of second transducers 18 and each array is disposed circumferentially around the conduit 12 and spaced from one another along the length of the conduit 12. Each array of the second transducers 18 is arranged surrounding the conduit 12 in a circler 36 to measure the flow rate of the fluid medium from different positions. In the illustrated embodiment, the second transducers 18 are arranged in two circlers 36. In another embodiment, the second transducers 18 may be arranged in three or more circlers 36 on the conduit 12. In the illustrated embodiment, the second transducers 18 are mounted on the conduit 12 at an angle with respect to a cross section of the conduit 12 to get longer paths the second ultrasound signals transmitting along. The second transducers 18 and the first transducer pairs 15 are arranged on different segments of the conduit 12. The first transducer pairs 15 in FIG. 5 are similar to the first transducer pairs 15 in FIG. 3 which are arranged in chordal paths.

Figure 6:
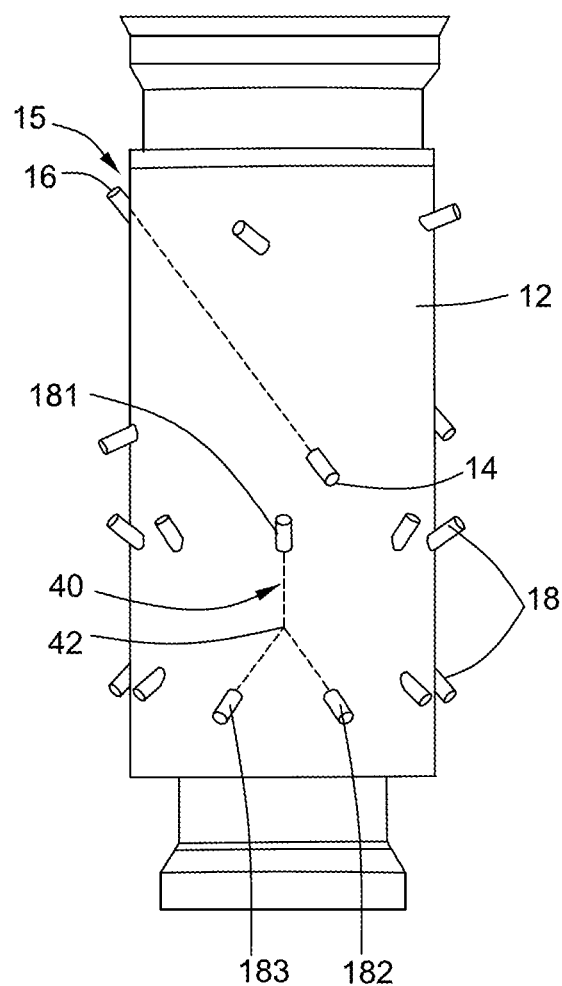
FIG. 6 is a schematic perspective view of a part of the conduit with the first transducer pairs and the second transducers thereon in accordance with another embodiment.

FIG. 6 illustrates a schematic perspective view of a part of the conduit 12 with the first transducer pairs 15 and the second transducers 18 thereon in accordance with another embodiment. The second transducers 18 each are arranged to receive the scattered signals from the ultrasound signals transmitted by that second transducer 18 and one or more different second transducers 18. In the illustrated embodiment, three of the second transducers, for example the second transducers 181-183, are arranged on three-dimensional paths 40 and transmit the ultrasound signals towards one focal area 42. The transducers 181-183 transmit the ultrasound signals along the three-dimensional paths 40 and the scattering components in the fluid medium reflect or backscatter the ultrasound signals. The transducer 181 receives the scattered signals from the ultrasound signals transmitted by the transducer 181 and the other two transducers 182 and 183. Similarly, the transducer 182 receives the scattered signals from the ultrasound signals transmitted by the transducer 182 and the other two transducers 181 and 183. And the transducer 183 receives the scattered signals from the ultrasound signals transmitted by the transducer 183 and the other two transducers 181 and 182.

In the illustrated embodiment, the second transducers 18 include multiple transducer sets like the transducers 181-183. In another embodiment, the second transducers 18 include multiple transducer sets each including two or more than three second transducers 18 to measure the flow rate in multi-dimension. In the illustrated embodiment, the first transducer pairs 15 are similar to or the same with the first transducer pairs 15 in FIG. 5.

Figure 7:
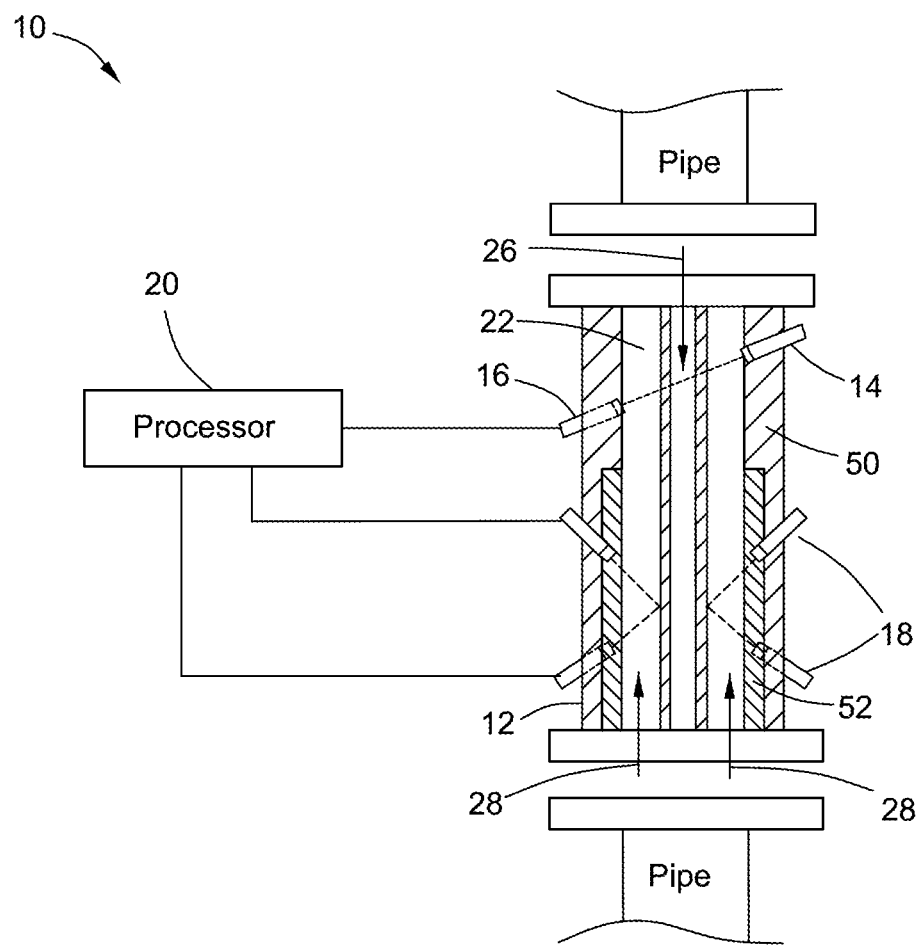
FIG. 7 is a schematic diagram of the ultrasonic flow meter system in accordance with another embodiment.

FIG. 7 illustrates a schematic diagram of the ultrasonic flow meter system 10 in accordance with another embodiment. A longitudinal section of the conduit 12 is illustrated in FIG. 7. The conduit 12 includes a main wall 50 and a liner 52 attached on the main wall 50. The second transducers 18 are mounted through the main wall 50 and isolated from the channel 22 of the conduit 12 by the liner 52. The first transducers 14 and 16 are mounted through the main wall 50 and into the channel 22 of the conduit 12.

The main wall 50 of the conduit 12 typically is made from an acoustic friendly material which also has good heat insulation capability, for example, a metal material including but not limited to metals and alloys. The main wall 50 provides structural support for the conduit 12. The liner 52 is made from a material which is substantially acoustic transparent and has thermal resistance higher than that of the main wall 50. In one embodiment, the liner 52 includes a non-metallic material. In one embodiment, the non-metallic material includes an organic polymeric material such as plastic. Such that the liner 52 is able to separate the second transducers 18, which are the Doppler transducers in one example, from the fluid medium 28 without compromising the acoustic characteristics. The first transducers 14 and 16 which are the transit-time transducers in one example can bear high temperature and high pressure. As such, the ultrasonic flow meter system 10 is particularly applicable in drilling, where the fluid flow measurement may be carried out in a high temperature and high pressure environment.

Figure 8:
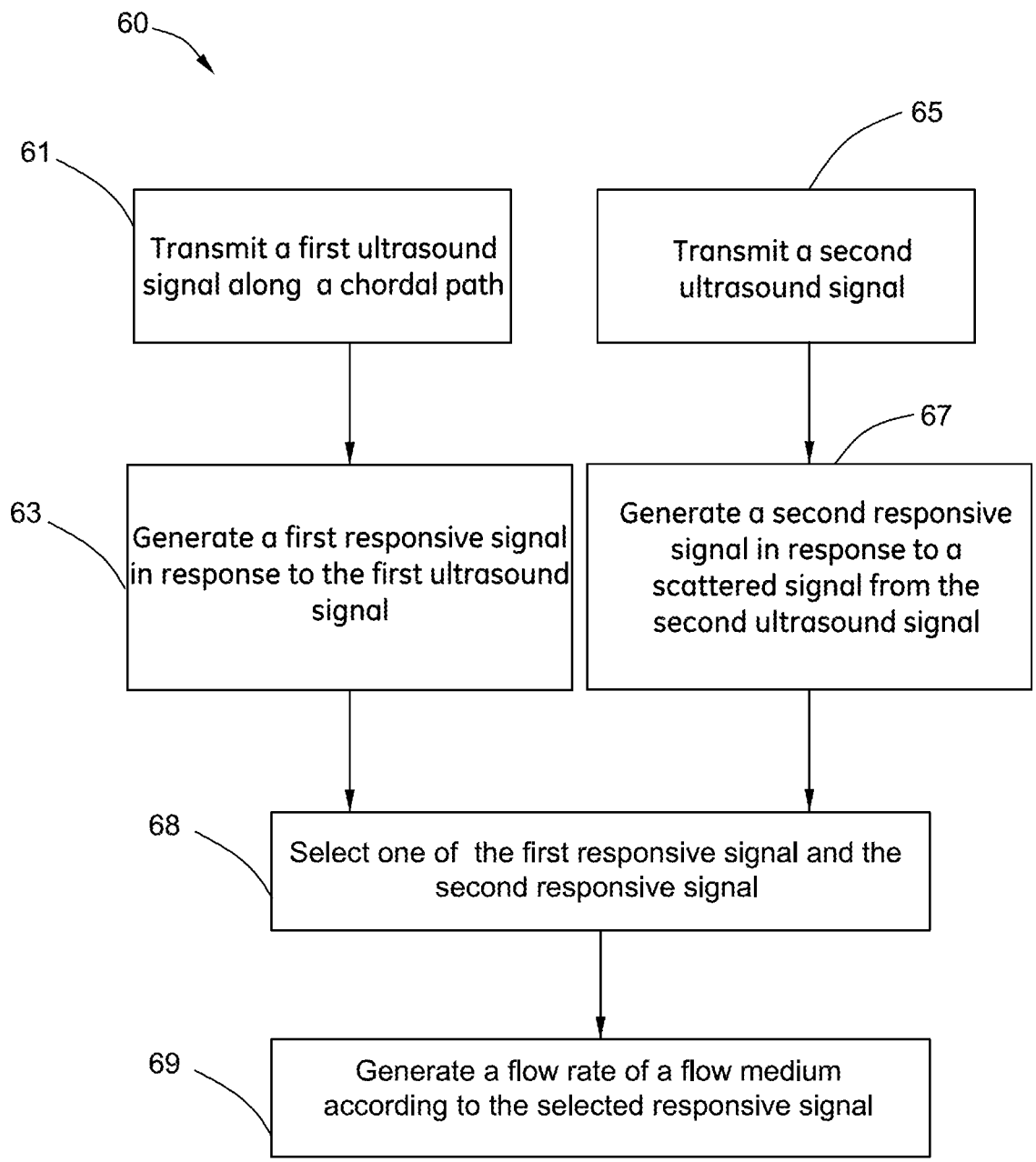
FIG. 8 is a flow chart of a method for measuring a flow rate of a flow medium accordance with one embodiment.

FIG. 8 illustrates a flow chart of a method 60 for measuring a flow rate of a flow medium in accordance with an embodiment. In block 61, a first ultrasound signal is transmitted in a chordal path through a conduit via a transmitting transducer of a first transducer pair. The conduit defines a channel for accommodating the flow medium. The first ultrasound signal is transmitted through the flow medium. The flow medium may have unstable flow and changing flow composition.

In block 63, a first responsive signal in response to the first ultrasound signal is generated via a receiving transducer of the first transducer pair on the chordal path. In one embodiment, the first transducer pair is a transit-time transducer pair including the transmitting transducer and the receiving transducer. The receiving transducer receives the first ultrasound signal from the transmitting transducer and generates the first responsive signal. In one embodiment, the first responsive signal is a transit-time signal generated in a transit-time mode. The transmitting transducer and the receiving transducer are mounted on the conduit in the chordal path. One or more first transducer pairs may be employed according to particular applications.

In block 65, a second ultrasound signal is transmitted into the conduit via a second transducer. The second transducer may be a Doppler transducer mounted on the conduit. One or more second transducers may be employed according to particular applications. In one embodiment, the second ultrasound signal is transmitted in a diameter path. In another embodiment, the second ultrasound signal is transmitted in a chordal path. In one embodiment, multiple of the second ultrasound signals are transmitted on three-dimensional paths. Three of the second transducers are arranged on the three-dimensional paths to transmit the second ultrasound signals to one focal area. In another embodiment, two or more than three second transducers are arranged on multi-dimensional paths to measure the flow rate of the flow medium from multiple dimensions. In one embodiment, multiple second ultrasound signals are transmitted via multiple arrays of the second transducers 18. Each array is disposed circumferentially around the conduit and spaced from one another along the length of the conduit.

In block 67, a second responsive signal in response to a scattered signal from the second ultrasound signal is generated via the second transducer. The second ultrasound signal is reflected or backscattered by scattering components in the fluid medium to generate the scattered signal. The scattered signal is received by the second transducer and then the second responsive signal is generated by the second transducer. In one embodiment, the scattered signals are received by the second transducer, which are from the second ultrasound signals transmitted by that second transducer and one or more different second transducers. In another embodiment, the scattered signals are received by the second transducer, which are from the second ultrasound signals transmitted by that second transducer itself.

In one embodiment, the second responsive signal is a Doppler signal generated in a Doppler mode. In one embodiment, the actions in the block 61, 63 may be implemented simultaneously with the actions in the block 65, 67. The first ultrasound signal and the second ultrasound signal may be transmitted at the same time.

In block 68, one of the first responsive signal and the second responsive signal is selected according to a relationship of the first responsive signal and noise thereof and a relationship of the second responsive signal and noise thereof. The first responsive signal and the second responsive signal are received and processed by a processor. One of the first responsive signal and the second responsive signal is selected to calculate the flow rate. In block 69, a flow rate of the flow medium through the conduit is generated via the processor according to the selected responsive signal. The selected responsive signal is further processed via the processor to generate the flow rate of the flow medium. Accordingly, the flow rate of the flow medium is generated without knowing the flow composition of the flow medium. The method 60 may be applicable for measuring the flow rate of the flow medium in drilling wells for exploration and production of hydrocarbons or other applications.

The invention may be embodied in other specific forms without departing from the spirit or essential characteristics thereof. The foregoing embodiments are therefore to be considered in all respects as illustrative rather than limiting on the invention described herein. The scope of embodiments of the invention is thus indicated by the appended claims rather than by the foregoing description, and all changes that come within the meaning and range of equivalency of the claims are therefore intended to be embraced therein.

The invention claimed is:

1. An ultrasonic flow meter system, comprising:
   a conduit defining a channel;
   at least one pair of first transducers mounted on the conduit and comprising a transmitting transducer and a receiving transducer for generating a first responsive signal, the first responsive signal having a first signal-to-noise ratio, the transmitting transducer and the receiving transducer arranged on a chordal path;
   at least one second transducer mounted on the conduit for generating a second responsive signal, the second responsive signal having a second signal-to-noise ratio; and
   a processor configured to receive the first responsive signal and the second responsive signal, select one of the first responsive signal and the second responsive signal based on a comparison between the first signal-to-noise ratio and the second signal-to-noise ratio, and determine a flow rate of a flow medium through the channel in the conduit according to the selected responsive signal.

2. The ultrasonic flow meter system of claim 1, wherein the at least one second transducer is arranged on a diameter path.

3. The ultrasonic flow meter system of claim 1, wherein the at least one second transducer comprises a plurality of second transducers each arranged to receive scattered signals from ultrasound signals transmitted by that second transducer and one or more different second transducers.

4. The ultrasonic flow meter system of claim 1, wherein the at least one second transducer comprises three second transducers arranged on three-dimensional paths and transmitting the ultrasound signals towards one focal area.

5. The ultrasonic flow meter system of claim 1, wherein the at least one second transducer comprises a plurality of arrays of the second transducers and each array is disposed circumferentially around the conduit and spaced from one another along the length of the conduit.

6. The ultrasonic flow meter system of claim 1, wherein the conduit comprises a main wall and a liner attached on the main wall, and the at least one second transducer is mounted through the main wall and isolated from the channel of the conduit by the liner.

7. The ultrasonic flow meter system of claim 6, wherein the liner comprises a non-metallic material.

8. The ultrasonic flow meter system of claim 6, wherein the at least one pair of first transducers is mounted through the main wall and into the channel of the conduit.

9. The ultrasonic flow meter system of claim 1, wherein the at least one pair of first transducers comprises a plurality of transit-time transducers for generating a transit-time signal.

10. The ultrasonic flow meter system of claim 1, wherein the at least one second transducers comprises one or more Doppler transducers for generating a Doppler signal.

11. A method, comprising:
   transmitting a first ultrasound signal along a chordal path through a conduit via a transmitting transducer of a first transducer pair;
   generating a first responsive signal in response to the first ultrasound signal via a receiving transducer of the first transducer pair on the chordal path, the first responsive signal having a first signal-to-noise ratio;
   transmitting a second ultrasound signal into the conduit via a second transducer;
   generating a second responsive signal in response to a scattered signal from the second ultrasound signal via the second transducer, the second responsive signal having a second signal-to-noise ratio;
   selecting one of the first responsive signal and the second responsive signal based on a comparison between the first signal-to-noise ratio and the second signal-to-noise ratio; and
   determining a flow rate of a flow medium through the conduit according to the selected responsive signal.

12. The method of claim 11, wherein transmitting the second ultrasound signal comprises transmitting the second ultrasound signal in a diameter path.

13. The method of claim 11, further comprising receiving, via the second transducer, a plurality of the scattered signals from a plurality of the second ultrasound signals transmitted by that second transducer and one or more different second transducers.

14. The method of claim 11, wherein transmitting the second ultrasound signal comprises transmitting a plurality of the second ultrasound signals on three-dimensional paths.

15. The method of claim 11, wherein transmitting the second ultrasound signal comprises transmitting a plurality of the second ultrasound signals via a plurality of arrays of the second transducers, and wherein each array is disposed circumferentially around the conduit and spaced from one another along the length of the conduit.

16. The method of claim 11, wherein the conduit comprises a main wall and a liner attached on the main wall, and the second transducer is mounted through the main wall and isolated from a channel of the conduit by the liner.

17. The method of claim 16, wherein the liner comprises a non-metallic material.

18. The method of claim 16, wherein the transmitting transducer and the receiving transducer of the first transducer pair are mounted through the main wall and into the channel of the conduit.

19. The method of claim 11, wherein generating the first responsive signal comprises generating a transit-time signal in a transit-time mode.

20. The method of claim 11, wherein generating the second responsive signal comprises generating a Doppler signal in a Doppler mode.

* * * * *